United States Patent
Yu et al.

(10) Patent No.: US 12,321,188 B2
(45) Date of Patent: Jun. 3, 2025

(54) NEURALECHO: A SELF-ATTENTIVE RECURRENT NEURAL NETWORK FOR UNIFIED ACOUSTIC ECHO SUPPRESSION, SPEAKER AWARE SPEECH ENHANCEMENT AND AUTOMATIC GAIN CONTROL

(71) Applicant: TENCENT AMERICA LLC, Palo Alto, CA (US)

(72) Inventors: Meng Yu, Palo Alto, CA (US); Yong Xu, Palo Alto, CA (US); Chunlei Zhang, Bellevue, WA (US); Shi-xiong Zhang, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/513,175

(22) Filed: Nov. 17, 2023

(65) Prior Publication Data
US 2024/0085935 A1    Mar. 14, 2024

Related U.S. Application Data

(63) Continuation of application No. PCT/US2022/423224, filed on Apr. 3, 2022, and a
(Continued)

(51) Int. Cl.
*G05F 1/66*     (2006.01)
*G05B 15/02*    (2006.01)
(Continued)

(52) U.S. Cl.
CPC .............. *G05F 1/66* (2013.01); *G05B 15/02* (2013.01); *G06N 5/04* (2013.01); *G06Q 50/06* (2013.01); *G06Q 90/00* (2013.01)

(58) Field of Classification Search
None
See application file for complete search history.

(56) References Cited

U.S. PATENT DOCUMENTS

| | | | |
|---|---|---|---|
| 6,282,176 B1 | 8/2001 | Hemkumar |
| 9,020,144 B1 | 4/2015 | Yang |
| (Continued) | | | |

FOREIGN PATENT DOCUMENTS

| | | |
|---|---|---|
| EP | 1 684 442 A1 | 7/2006 |
| WO | 2023/048838 A1 | 3/2023 |

OTHER PUBLICATIONS

Pfeifenberger et al.; "Nonlinear Residual Echo Suppression Using a Recurrent Neural Network"; Oct. 2020; Interspeech. (Year: 2020).*
(Continued)

*Primary Examiner* — Umut Onat
(74) *Attorney, Agent, or Firm* — Sughrue Mion, PLLC

(57) ABSTRACT

A method of acoustic echo suppression using a recurrent neural network, performed by at least one processor, is provided. The method includes receiving a microphone signal and a far-end reference signal, estimating an echo suppressed signal and an echo signal based on the microphone signal and the far-end reference signal, estimating enhancement filters for the microphone signal based on the echo suppressed signal and the echo signal, generating an enhanced signal based on the enhancement filters, and adjusting the enhanced signal using automatic gain control (AGC) and outputting the adjusted signal.

20 Claims, 7 Drawing Sheets

Related U.S. Application Data continuation-in-part of application No. 17/840,188, filed on Jun. 14, 2022, now Pat. No. 11,902,757.

(51) Int. Cl.
*G06N 5/04* (2023.01)
*G06Q 50/06* (2024.01)
*G06Q 90/00* (2006.01)

(56) References Cited

U.S. PATENT DOCUMENTS

| | | | |
|---|---|---|---|
| 9,768,829 | B2 | 9/2017 | Yemdji et al. |
| 9,936,290 | B2 | 4/2018 | Mohammad et al. |
| 10,115,411 | B1 | 10/2018 | Chu et al. |
| 10,446,169 | B1 | 10/2019 | Kamdar et al. |
| 11,902,757 | B2 * | 2/2024 | Yu .................. G10L 21/0208 |
| 2001/0002203 | A1 * | 5/2001 | Cahn .................. H04B 1/707 375/E1.032 |
| 2003/0076947 | A1 | 4/2003 | Furuta et al. |
| 2003/0123674 | A1 | 7/2003 | Boland et al. |
| 2005/0286714 | A1 | 12/2005 | Tokuda et al. |
| 2006/0034448 | A1 | 2/2006 | Parry |
| 2010/0057454 | A1 | 3/2010 | Mohammad et al. |
| 2012/0288100 | A1 | 11/2012 | Cho |
| 2013/0044890 | A1 | 2/2013 | Kihara et al. |
| 2013/0230184 | A1 | 9/2013 | Kuech et al. |
| 2014/0177822 | A1 | 6/2014 | Sorensen |
| 2016/0358602 | A1 | 12/2016 | Krishnaswamy et al. |
| 2017/0365247 | A1 | 12/2017 | Ushakov |
| 2019/0313180 | A1 * | 10/2019 | Kadiwala .................. H04R 1/10 |
| 2019/0339319 | A1 * | 11/2019 | Jakupi .................. H02H 7/26 |

OTHER PUBLICATIONS

Ma et al.; "Acoustic echo cancellation by combining adaptive digital filter and recurrent neural network"; May 2020; arXiv preprint arXiv:2005. (Year: 2020).*

Written Opinion dated Dec. 14, 2022, issued in International Application No. PCT/US2022/042324.

International Search Report dated Dec. 14, 2022, issued in International Application No. PCT/US2022/042324.

Meng Yu et al., "NeuralEcho: A Self-Attentive Recurrent Neural Network For Unified Acoustic Echo total) Suppression and Speech Enhancement", arXiv:2205.10401v1 [eess.AS], May 20, 2022, pp. 1-5 (5 pages).

Extended European Search Report dated Jan. 7, 2025, issued in European Application No. 22947039.8.

* cited by examiner

NEURALECHO: A SELF-ATTENTIVE RECURRENT NEURAL NETWORK FOR UNIFIED ACOUSTIC ECHO SUPPRESSION, SPEAKER AWARE SPEECH ENHANCEMENT AND AUTOMATIC GAIN CONTROL

CROSS-REFERENCE TO RELATED APPLICATION

This application is a Continuation Application of U.S. application Ser. No. 17/840,188, filed on Jun. 14, 2022, now U.S. Pat. No. 11,902,757 issued on Feb. 13, 2024, which is a continuation of PCT Application No. PCT/US2022/042324, which was filed on Sep. 1, 2022. This application is a continuation of application Continuation of application Ser. No. 17/840,188, filed one Jun. 14, 2022. The entirety of each of the above-identified documents are incorporated by reference herein.

BACKGROUND

Field

Apparatuses and methods consistent with example embodiments of the present disclosure generally relate to data processing with neural networks and deep learning for speech enhancement. Specifically, embodiments relate to training a NeuralEcho model and automatic gain control (AGC) tasks in a unified model to perform acoustic echo cancellation (AEC) and improve echo and noise suppression.

Description of Related Art

Acoustic echo cancellation (AEC) plays an important role in the full-duplex speech communication as well as the front-end speech enhancement for recognition in conditions when a loudspeaker plays back.

In related art, adaptive filtering methods for estimating the acoustic echo path and linear echo cancellation have been studied. Normalized least mean square filters (e.g., frequency-domain adaptive filter and multi-delay block frequency domain adaptive filter) are widely used due to their robustness and low complexity. The non-linear post processing is typically cascaded for residual echo suppression. However, these methods are not efficient for non-linear echo distortion, echo path change, and non-stationary noises. As such, deep neural networks (e.g., complex-valued DNNs, long short term memory networks, and multi-head self-attention) have been employed to develop echo suppression systems to better handle non-linear echo distortions and echo path delay. In related art, linear adaptive filtering followed by the neural network based residual echo suppression are adopted to form a hybrid system for AEC system design and have achieved promising results.

Related art also describe a two-stage multi-channel joint AEC and beamforming and a NN3A model which supports audio front-end AEC, noise suppression, and AGC. AEC has also been formulated as an end-to-end supervised speech enhancement problem, where a neural network is adopted to predict the mask for extracting the near-end target speaker. In some related art, a dual signal transformation LSTM network (DTLN) is adopted to the AEC task and a Wave-U-Net based acoustic echo cancellation with an attention mechanism is proposed to jointly suppress acoustic echo and background noise. Using complex neural networks together with frequency-time-LSTMs (F-T-LSTM) provide important phase information modeling and temporal modeling, outperforming the best methods in AEC.

SUMMARY

According to embodiments, methods are provided for acoustic echo suppression via a NeuralEcho model and automatic gain control (AGC) trained in a unified model to perform acoustic echo cancellation (AEC) and improve echo and noise suppression.

According to an aspect of the disclosure, a method for acoustic echo suppression using a recurrent neural network, performed by at least one processor. The method includes receiving a microphone signal and a far-end reference signal, estimating an echo suppressed signal and an echo signal based on the microphone signal and the far-end reference signal, estimating enhancement filters for the microphone signal based on the echo suppressed signal and the echo signal, generating an enhanced signal based on the enhancement filters, and adjusting the enhanced signal using automatic gain control (AGC) and outputting the adjusted signal.

The method may further include a first stage and a second stage, wherein the echo suppressed signal and the echo signal are estimated by the first stage and the enhancement filters are estimated by the second stage.

The method may further include, in the first stage, computing a first covariance matrix based on the microphone signal and the far-end reference signal, processing the first covariance matrix through a first linear projection filter and encoding a result of the first linear projection filter to estimate first stage filters, applying the first stage filters to a time-frequency shifted microphone signal and far-end reference signal, and outputting the echo suppressed signal and the echo signal.

The method may further include, in the second stage, generating a second stage input feature based on the first linear projection filter and the normalized log-power spectra of the echo suppressed signal and the echo signal, processing the second stage input feature through a second linear projection filter, encoding a result of the second linear projection filter to estimate second stage filters, and applying the second stage filters to estimate channels of target speech and microphone noise, computing a second covariance matrix based on the estimated channels of target speech and microphone noise, and processing the second covariance matrix through the recurrent neural network and outputting the enhancement filters.

The method may further include wherein the microphone signal includes a target speech, a distorted far-end reference signal, and microphone noise.

The method may further include calculating a loss functions based on a scale-invariant signal-to-distortion ratio in the time domain and the L1-norm of the spectrum magnitude difference between the enhanced signal and a target signal.

The method may further include wherein the adjusting the enhanced signal includes: encoding an enhanced signal magnitude to predict the AGC magnitude, generating an AGC signal in the time domain based on a phase of the enhanced signal, and adjusting the enhanced signal based on the AGC signal.

According to another aspect of the disclosure, an apparatus for acoustic echo suppression using a recurrent neural network including at least one memory configured to store program code and at least one processor configured to read the program code and operate as instructed by the program code. The program code including receiving code configured to cause the at least one processor to receive a microphone signal and a far-end reference signal, signal estimating code configured to cause the at least one processor to estimate an echo suppressed signal and an echo signal based on the microphone signal and the far-end reference signal, filter estimating code configured to cause the at least one processor to estimate enhancement filters for the microphone signal based on the echo suppressed signal and the echo signal, generating code configured to cause the at least one processor to generate an enhanced signal based on the enhancement filters, and adjusting code configured to cause the at least one processor to adjust the enhanced signal using automatic gain control (AGC) and outputting the adjusted signal.

The apparatus may further include a first stage and a second stage, wherein the echo suppressed signal and the echo signal are estimated by the first stage and the enhancement filters are estimated by the second stage.

The apparatus may further include, in the first stage, computing code configured to cause the at least one processor to compute a first covariance matrix based on the microphone signal and the far-end reference signal, processing code configured to cause the at least one processor to process the first covariance matrix through a first linear projection filter and encoding a result of the first linear projection filter to estimate first stage filters, applying code configured to cause the at least one processor to apply the first stage filters to a time-frequency shifted microphone signal and far-end reference signal, and outputting code configured to cause the at least one processor to output the echo suppressed signal and the echo signal.

The apparatus may further include, in the second stage, second generating code configured to cause the at least one processor to generate a second stage input feature based on the first linear projection filter and the normalized log-power spectra of the echo suppressed signal and the echo signal, second processing code configured to cause the at least one processor to process the second stage input feature through a second linear projection filter, encoding a result of the second linear projection filter to estimate second stage filters, and applying the second stage filters to estimate channels of target speech and microphone noise, second computing code configured to cause the at least one processor to compute a second covariance matrix based on the estimated channels of target speech and microphone noise, and third processing code configured to cause the at least one processor to process the second covariance matrix through the recurrent neural network and outputting the enhancement filters.

The apparatus may further include wherein the microphone signal includes a target speech, a distorted far-end reference signal, and microphone noise.

The apparatus may further include calculating code configured to cause the at least one processor to calculate a loss functions based on a scale-invariant signal-to-distortion ratio in the time domain and the L1-norm of the spectrum magnitude difference between the enhanced signal and a target signal.

The apparatus may further include, in the adjusting code, encoding code configured to cause the at least one processor to encode an enhanced signal magnitude to predict the AGC magnitude, AGC generating code configured to cause the at least one processor to generate an AGC signal in the time domain based on a phase of the enhanced signal, and second adjusting code configured to cause the at least one processor to adjust the enhanced signal based on the AGC signal.

According to another aspect of the disclosure, a non-transitory computer-readable medium storing instructions that are executed by at least one processor of an apparatus for acoustic echo suppression using a recurrent neural network. The instructions cause the at least one processor to generate a microphone signal and a far-end reference signal, estimate an echo suppressed signal and an echo signal based on the microphone signal and the far-end reference signal, estimate enhancement filters for the microphone signal based on the echo suppressed signal and the echo signal, generate an enhanced signal based on the enhancement filters, and adjust the enhanced signal using automatic gain control (AGC) and outputting the adjusted signal.

The non-transitory computer-readable medium may further include a first stage and a second stage, wherein the echo suppressed signal and the echo signal are estimated by the first stage and the enhancement filters are estimated by the second stage.

The non-transitory computer-readable medium may further include wherein the instructions further cause the at least one processor to, in the first stage, compute a first covariance matrix based on the microphone signal and the far-end reference signal, process the first covariance matrix through a first linear projection filter and encoding a result of the first linear projection filter to estimate first stage filters, apply the first stage filters to a time-frequency shifted microphone signal and far-end reference signal, and output the echo suppressed signal and the echo signal.

The non-transitory computer-readable medium may further include wherein the instructions further cause the at least one processor to, in the second stage, generate a second stage input feature based on the first linear projection filter and the normalized log-power spectra of the echo suppressed signal and the echo signal, process the second stage input feature through a second linear projection filter, encoding a result of the second linear projection filter to estimate second stage filters, and applying the second stage filters to estimate channels of target speech and microphone noise, compute a second covariance matrix based on the estimated channels of target speech and microphone noise, and process the second covariance matrix through the recurrent neural network and outputting the enhancement filters.

The non-transitory computer-readable medium may further include wherein the microphone signal includes a target speech, a distorted far-end reference signal, and microphone noise.

The non-transitory computer-readable medium may further include wherein the instructions further cause the at least one processor to calculate a loss functions based on a scale-invariant signal-to-distortion ratio in the time domain and the L1-norm of the spectrum magnitude difference between the enhanced signal and a target signal.

Additional embodiments will be set forth in the description that follows and, in part, will be apparent from the description, and/or may be realized by practice of the presented embodiments of the disclosure.

BRIEF DESCRIPTION OF THE DRAWINGS

The above and other aspects, features, and aspects of embodiments of the disclosure will be more apparent from the following description taken in conjunction with the following accompanying drawings.

DETAILED DESCRIPTION

Figure 1:
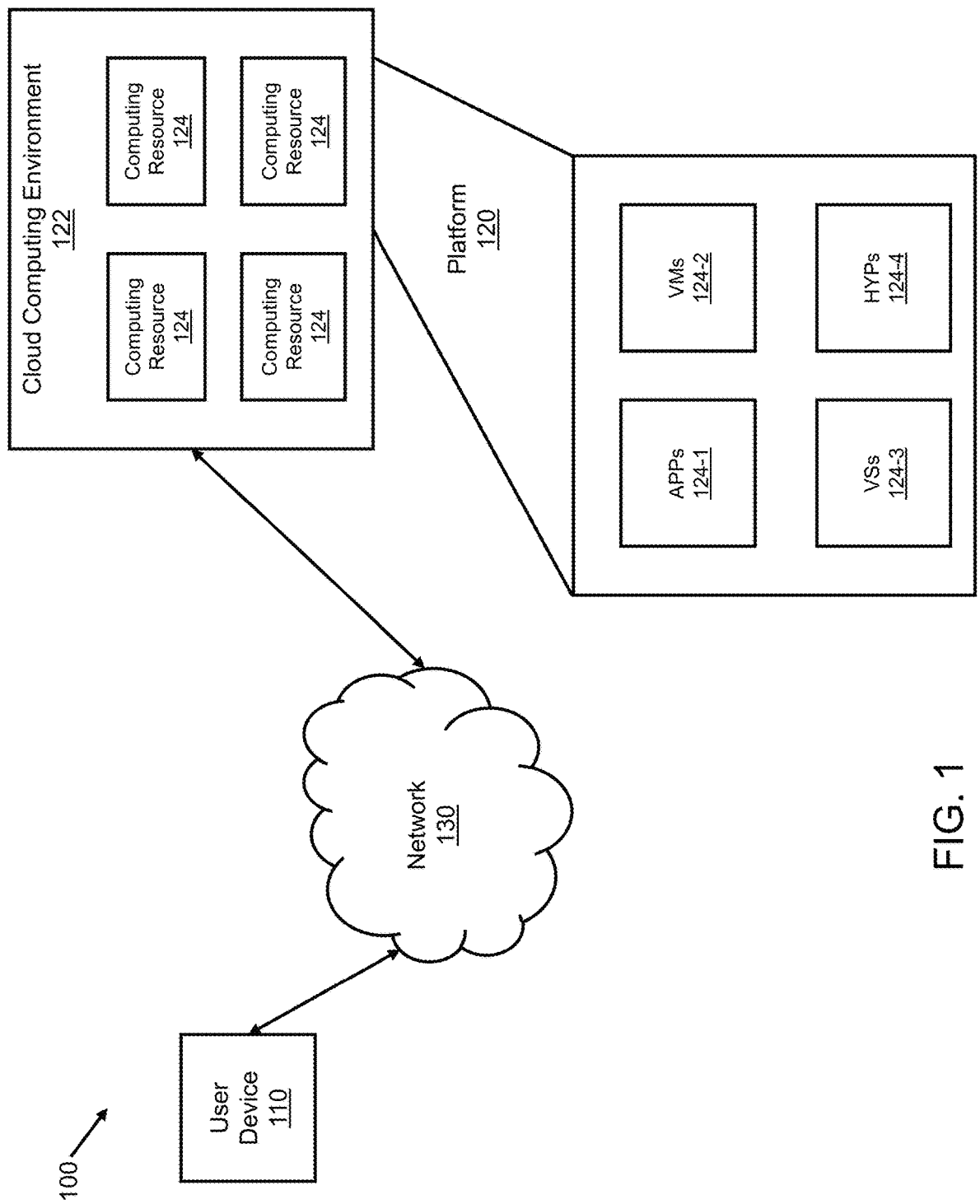
FIG. 1 is a diagram of devices of a system according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method, an apparatus, and a computer program to, among other things, perform acoustic echo suppression. With the increased use of hands-free devices and remote conferencing, speech-based human-machine interaction and voice communication have prevailed, and thus an improved acoustic echo cancellation (AEC) model may be advantageous.

Acoustic echo is caused by the sound from a loudspeaker which is received by a near-end microphone and then transmitted to the far-end listener or speech recognition engine. The quality of a speech signal is degraded by acoustic echoes, environmental noises, room reverberation, hardware receivers, digital signal processing, and networking transmission. Such interfering signals degrade the voice quality in teleconference systems, mobile communication and hand-free human-machine interaction and limit the performance of AEC algorithms.

The following described exemplary embodiments provide a system, method and computer program that uses an all-deep-learning based AEC system by recurrent neural networks for acoustic echo suppression. An end-to-end two-stage single-channel AEC and a noise reduction model (namely, a NeuralEcho model) is used to perform the acoustic echo suppression. In the first stage, the model implicitly estimates an echo signal and AEC output. The echo/noise covariance matrix and target speech covariance matrix are estimated across the estimated echo channel, AEC output channel, and the input microphone channel. In the second stage, given the second order statistics of echo/noise and target speech, speech enhancement filters are predicted. This model leverages cross-channel second-order statistics for better echo/noise reduction and target speaker preservation. Together with an RNN model structure, a multi-head self-attention is employed over time to dynamically emphasize relevant features.

Furthermore, feature-wise linear modulation (FiLM) is used to comb the target speaker embedding vector with other acoustic features which allows the network to better separate the target speech signal from echo and other interference. An AGC branch is also integrated into the system to amplify speech signals to an intelligible sound level, which is in high demand in real-time communications (RTC). Particularly, a traditional AGC algorithm is placed in a post-processing stage. By training the NeuralEcho model and the AGC branch together as part of a unified model, the output of the AGC branch not only adjusts the processed signal to a proper sound level, but also improves speech recognition accuracy.

FIG. 1 is a diagram of an environment 100 in which methods, apparatuses, and systems for acoustic echo suppression described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
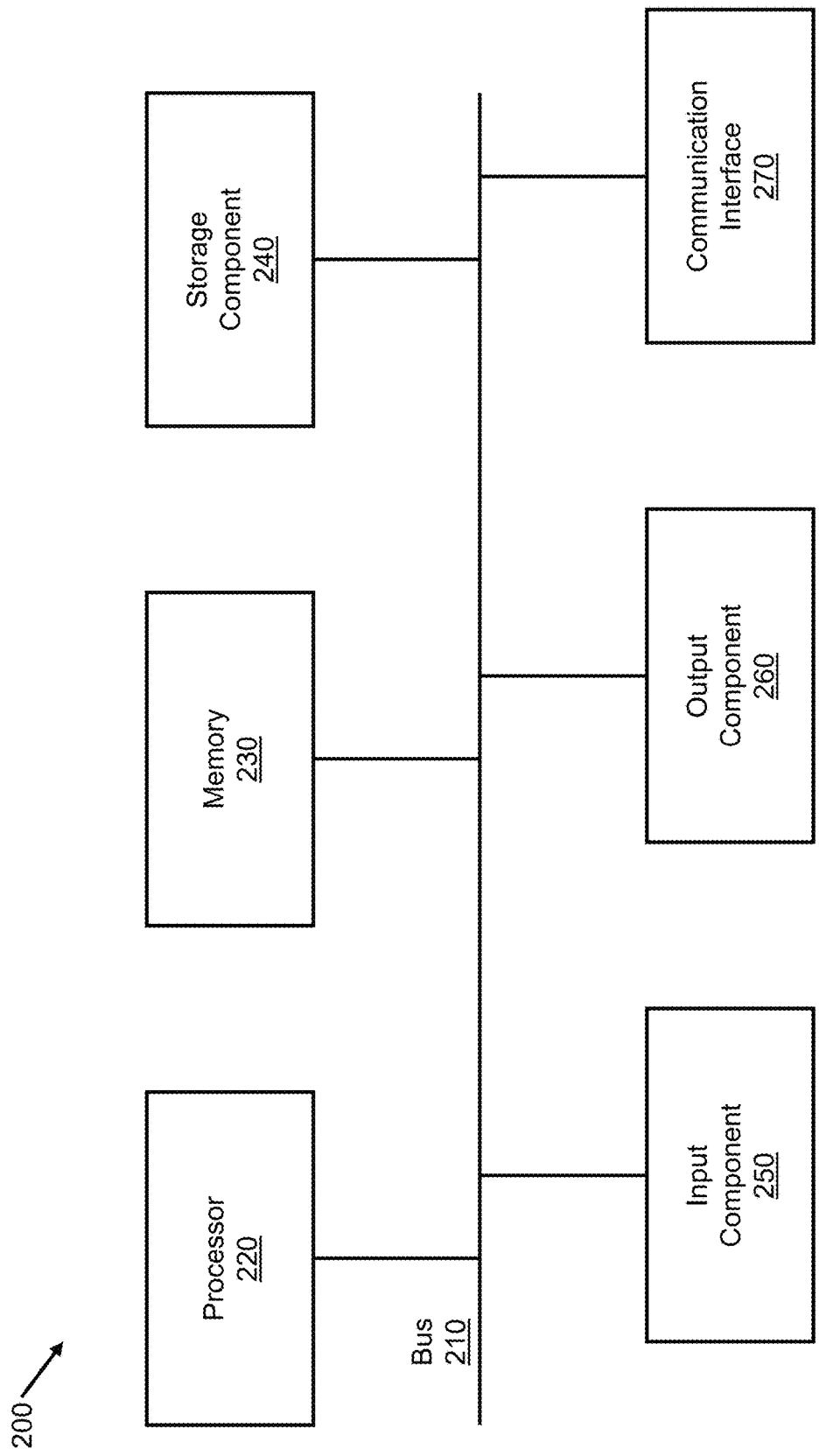
FIG. 2 is a diagram of components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

In embodiments, any one of the operations or processes of FIGS. 3-7 may be implemented by or using any one of the elements illustrated in FIGS. 1 and 2.

Figure 3:
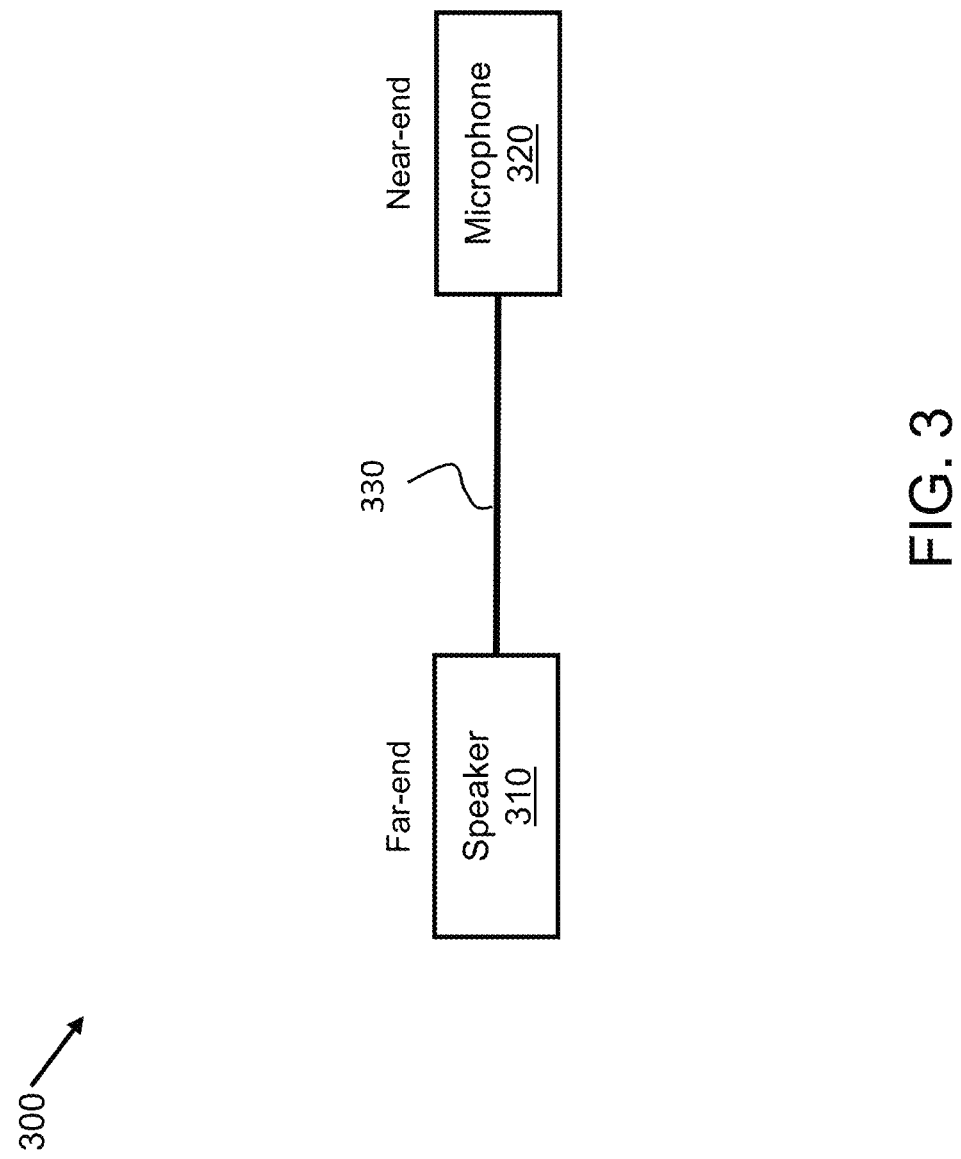
FIG. 3 is a block diagram of a system according to an embodiment.

FIG. 3 is a block diagram of an example acoustic system 300, according to an embodiment. The system includes a far-end speaker 310 (hereinafter "speaker") and a near-end microphone 320 (hereinafter "microphone").

For example, the microphone 320 receives a near-end target speech signal 330 from the speaker 310. The speaker 310 may be any audio source (e.g., a loudspeaker, recorded audio, spoken audio, etc.) that would be apparent to those of ordinary skill in the art without departing from the scope of the described embodiments. The target speech signal 330 includes, e.g., reverberation, far-end echo signals from the speaker 310, and background noise. Let s and x represent the dry clean signal from the near-end microphone 320 and the dry clean signal from the far-end speaker 310, respectively. The signal captured by the microphone 320 at time t can be represented by:

$$y(t)=s_r(t)+x_r(t)+v(t) \quad \text{(Equation 1)}$$

where $s_r(t)=h_s(t)*s(t)$ and $s_r(t)$ is the reverberant target speech signal, $x_r(t)=h_x(t)*g(x(t))$ and $x_r(t)$ is the distorted far-end signal emitted by the speaker 310, v(t) denotes the near-end noise signal, and * denotes the convolution. Additionally, the function g denotes the non-linear distortion, and echo path delay and near-end reverberation are included in $h_x(t)$.

Figure 4:
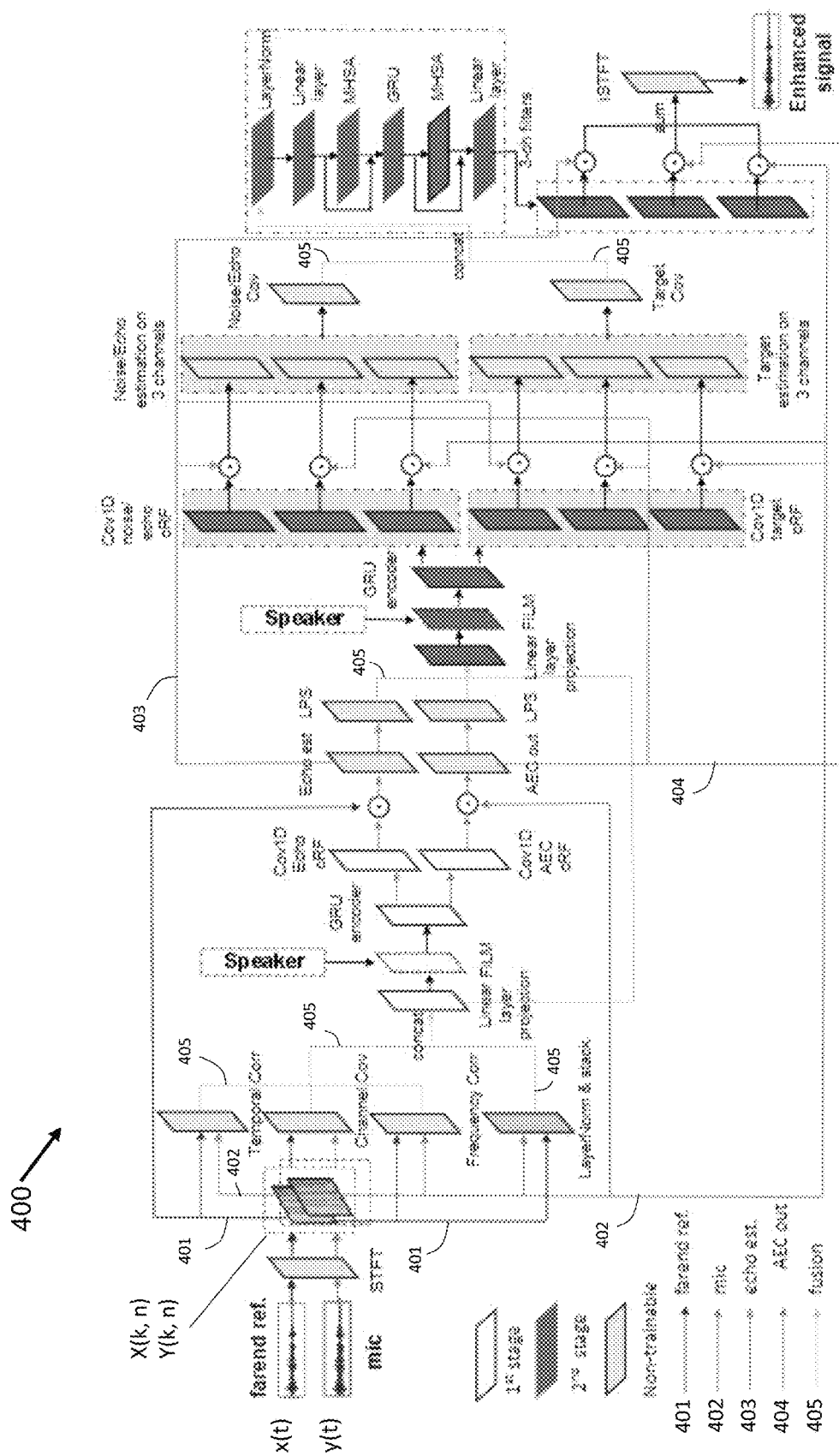
FIG. 4 illustrates a NeuralEcho model with two-stage single-channel acoustic echo cancellation (AEC) and noise reduction, according to an embodiment.

FIG. 4 is an illustration of a NeuralEcho model 400 with a two-stage single-channel AEC and noise reduction for performing acoustic echo suppression. As shown in FIG. 4, given the microphone signal y(t) and far-end reference signal x(t), the reverberant target speech signal $s_r(t)$ is predicted while suppressing the far-end echo signal and background noise. The NeuralEcho model 400 is used for predict the reverberant target speech signal $s_r(t)$. For reference in FIG. 4, lines indicating the far-end reference signal x(t) denoted by reference numeral 401, lines indicating the microphone signal y(t) are denoted by reference numeral 402, and fusion lines indicating where one or more output signals are combined and input to another layer are denoted by the reference numeral 405.

First, audio samples of the microphone signal y(t) and far-end reference signal x(t) are transformed to frequency domain as Y(k, n) and X(k, n), respectively, by short time Fourier transform (STFT), where k represents frequency bin and n represents frame index. A 512-point fast Fourier transform (FFT) (e.g., using a Hanning window with a 32 ms length and 16 ms hop size) is used to decode the audio samples. The frequency representations Y(k, n) and X(k, n) are stacked up, resulting in Z(k, n), where Z(k, n)=[Y(k, n), X(k, n)]T. The covariance matrix of Z is represented as $\Phi C(k, n) \in C2\times2$, denoted by Channel Cov layer shown in FIG. 4, and used as an input feature. This accounts for cross-correlation between the far-end reference signal x(t) and the microphone signal y(t), as well as a power spectral density (PSD) of the microphone signal y(t) and the far-end reference signal x(t). The covariance matrix $\Phi C (k, n)$ is computed as:

$$\Phi C(k,n)=(Z(k,n)-\mu_z)(Z(k,n)-\mu_z)H \quad \text{(Equation 2)}$$

where $$\mu_z = \frac{1}{2}\sum_{i=1}^{2} Z_i(k, n),$$

i represents the channel index, and H represents an Hermitian operator.

The upper half of the complex symmetrical matrix is discarded to reduce computational cost and memory usage. The lower triangular matrix is flattened and the real and imaginary parts are concatenated. Furthermore, for the microphone signal y(t) and the far-end reference signal x(t), a correlation matrix across time frames and frequency bins are separately computed. Specifically, temporal correlation ΦT and frequency correlation ΦF are computed, at the Temporal Corr and Frequency Corr layers shown in FIG. 4, as follows.

$$\Phi_i^T(k,n)=[Z_i(k,n),Z_i(k,n-1),\ldots,Z_i(k,n-n_\tau)][Z_i(k,n),Z_i(k,n-1),\ldots,Z_i(k,n-n_\tau)]^H$$

$$\Phi_i^F(k,n)=[Z_i(k,n),Z_i(k,n-1),\ldots,Z_i(k-k_\tau,n)][Z_i(k,n),Z_i(k-1),\ldots,Z_i(k-k_\tau,n)]^H \quad \text{(Equation 3)}$$

where i represents microphone and far-end reference channels, and $n_\tau$ and $k_\tau$ correspond to the maximum shift along the time and frequency axis, respectively. In this example, the maximum shift is set to 9 in the model (for predicting the reverberant target speech signal $s_r(t)$) to capture the signal's temporal and frequency dependency. Similarly, the lower triangular matrix is flattened and the real and imaginary parts of both the microphone and far-end reference channels are concatenated. The three features (i.e., the covariance matrix ΦC, the temporal correlation ΦT, and the frequency correlation ΦF) are concatenated together with the normalized log-power spectra (LPS) of the microphone signal y(t) and the far-end reference signal x(t), denoted by the LayerNorm & Stack layer shown in FIG. 4, to generate a first stage input feature.

A feature vector for each time-frequency bin of the first stage input feature is projected to a one-dimensional space through a linear FiLM projection layer (e.g., from 368-dim to 1-dim). The feature vector for each time-frequency bin may also be projected to speaker information (e.g., information relating to the speaker 310). The speaker information is optional (thus illustrated by a dotted line) and is not required by the NeuralEcho model 400. After a gated recurrent unit (GRU) encoder layer (e.g., a GRU encoder layer with 257 hidden units), the NeuralEcho model 400 estimates dimensional complex-valued ratio filters cRFAEC (k, n) and cRFecho(k, n) for the first stage AEC output and an echo estimation, respectively. The dimensional complex-valued ratio filters cRFAEC (k, n) and cRFecho(k, n) may be estimated based on (2K+1)×(2N+1) and are denoted by Cov1D AEC cRF and Cov1D Echo cRF in FIG. 4. Equation 4 demonstrates the computation of applying the estimated cRFAEC (k, n) on a time-frequency shifted version of the input microphone signal Y(k, n) to produce an echo suppressed signal YAEC, denoted AEC out in FIG. 4. A similar operation is applied on the far-end reference signal X(k, n) to produce an echo estimation Xecho(k, n), denoted Echo est in FIG. 4. Hereafter, for reference in FIG. 4, lines indicating the Echo est signal are denoted by reference numeral 403 and lines indicating the AEC out signal are denoted by reference numeral 404.

$$Y_{AEC} = \sum_{\tau_k\in[-K,K],\tau_n\in[-N,N]} cRF_{AEC}(k,n,\tau_k,\tau_n)* \quad \text{(Equation 4)}$$

$$Y(k+\tau_k, n+\tau_n)$$

In the second stage, the raw microphone input channel, the first stage AEC processed channel, and the echo estimation channel (represented by ~Z(k, n)=[Y(k, n), YAEC (k, n), Xecho(k, n)]T)) are used to learn the speech enhancement solution filters from an estimated echo/noise covariance matrix ΦN N (k, n), and a target near-end speech covariance matrix ΦSS (k, n). First, the LPS of YAEC and Xecho are computed, which are then concatenated with the acoustic feature from the linear FiLM projection layer in the first stage to serve as the second stage input feature. The second stage input feature goes through a linear FiLM projection layer (257 hidden units), speaker information (e.g., information relating to the loudspeaker 310), and a GRU layer (257 hidden units). The speaker information is provided as an option and is not required by the model 400. The GRU outputs are then passed through one dimensional convolution layers (i.e., Cov1D noise/echo cRF and to Cov1D target cRF shown in FIG. 4) estimate complex ratio filters (cRFN and cRFS) for estimating the echo/noise and target speech in ~Z. The complex ratio filters are applied to ~Z in the same way as Equation 4 to estimate the three channels' complex spectrum of echo/noise and target speech, respectively, for each time-frequency bin. Further, similar to Equation 2, the echo/noise covariance matrix ΦN N (k, n) and target speech covariance matrix ΦSS (k, n) are computed at Noise/Echo Cov and Target Cov layers in FIG. 4, respectively. Then the lower triangular matrix is flattened and the two matrices' real and imaginary parts (i.e., ΦN N (k, n) and ΦSS (k, n)) are concatenated. These features are normalized through layer normalization and then fed to the self-attentive RNN layers for enhancement filter estimation. The model structure is formulated as:

$$\Phi_{norm}=\text{LayerNorm}([\Phi_{NN},\Phi_{SS}]),$$

$$\Phi_{proj}=\text{LeakyReLU}(\text{DNN}(\Phi_{norm})),$$

$$\Phi_{attn}=\Phi_{proj}(k,n)+\text{ReLU}(\text{MHSA}(\Phi_{proj})),$$

$$\Phi_{gru}=\text{GRU}(\Phi_{attn}),$$

$$\Phi_{attn}=\Phi_{gru}+\text{ReLU}(\text{MHSA}(\Phi_{gru})),$$

$$W=\text{DNN}(\Phi_{attn}) \quad \text{(Equation 5)}$$

where MHSA stands for multi-head self-attention with, e.g., four parallel attention heads. The time-frequency index (k, n) is omitted in the above formula. Attention is performed to select important features across time frames and Φproj, performed as the query of the attention, is dot-product with itself, performed as a key and value of the attention, generating attention weights. The value is weighted averaged using the attention weights, along with a residual connection, and then fed to a GRU encoder. A second self-attention module followed by a linear projection layer is performed to estimate the single-tap speech enhancement filters W∈CF×T×3 for microphone channel, first stage AEC channel, and echo estimation channel, respectively. The results are then summed, resulting in a complex-valued matrix. The complex-values matrix is then transformed to the time domain by inverse short time Fourier transform (iSTFT) to generate an enhanced signal ^Sr.

The loss function of the two-stage single-channel AEC and NeuralEcho model 400 is defined as follows.

$$\text{Loss}_{NeuralEcho} = \text{SISDR}(\hat{s}_r, s_r) + \alpha l_1(\hat{S}_r, S_r) \quad \text{(Equation 6)}$$

Equation 6 is calculated using the combination of scale-invariant signal-to-distortion ratio (SI-SDR) in the time domain and L1-norm of the spectrum magnitude difference between the enhanced signal ^Sr and the target signal Sr. The L1-loss on the spectrum magnitude helps to regularize the scale of the output signal.

The speaker embedding is combined with other acoustic features using feature-wise linear modulation (FiLM), as shown in FIG. 4, in both stages. Speech separation using speaker embedding improves a user's speech quality not only in multi-talker conditions but also in ambient noises. A residual connection is added after the FiLM layer to fuse the features together and to ensure that the NeuralEcho model 400 can perform well when the speaker embedding is absent. Mathematically, this configuration of feature fusion transforms the input acoustic feature θ and speaker embedding ds to produce the output feature ξ as follows:

$$\hat{\theta} = \theta + r(d_n) \odot \theta + h(d_A),$$

$$\xi = \text{LayerNorm}(\hat{\theta}) + \theta \quad \text{(Equation 7)}$$

where r(•) and h(•) are linear projections from 128 dimensional speaker embeddings to a 257 dimensional vector to match the size of the input acoustic feature θ. The speaker embedding ds, providing a global bias for the target speaker, is provided by averaging speaker vectors over the five enrolled utterances in the NeuralEcho model 400 architectural setup.

Figure 5:
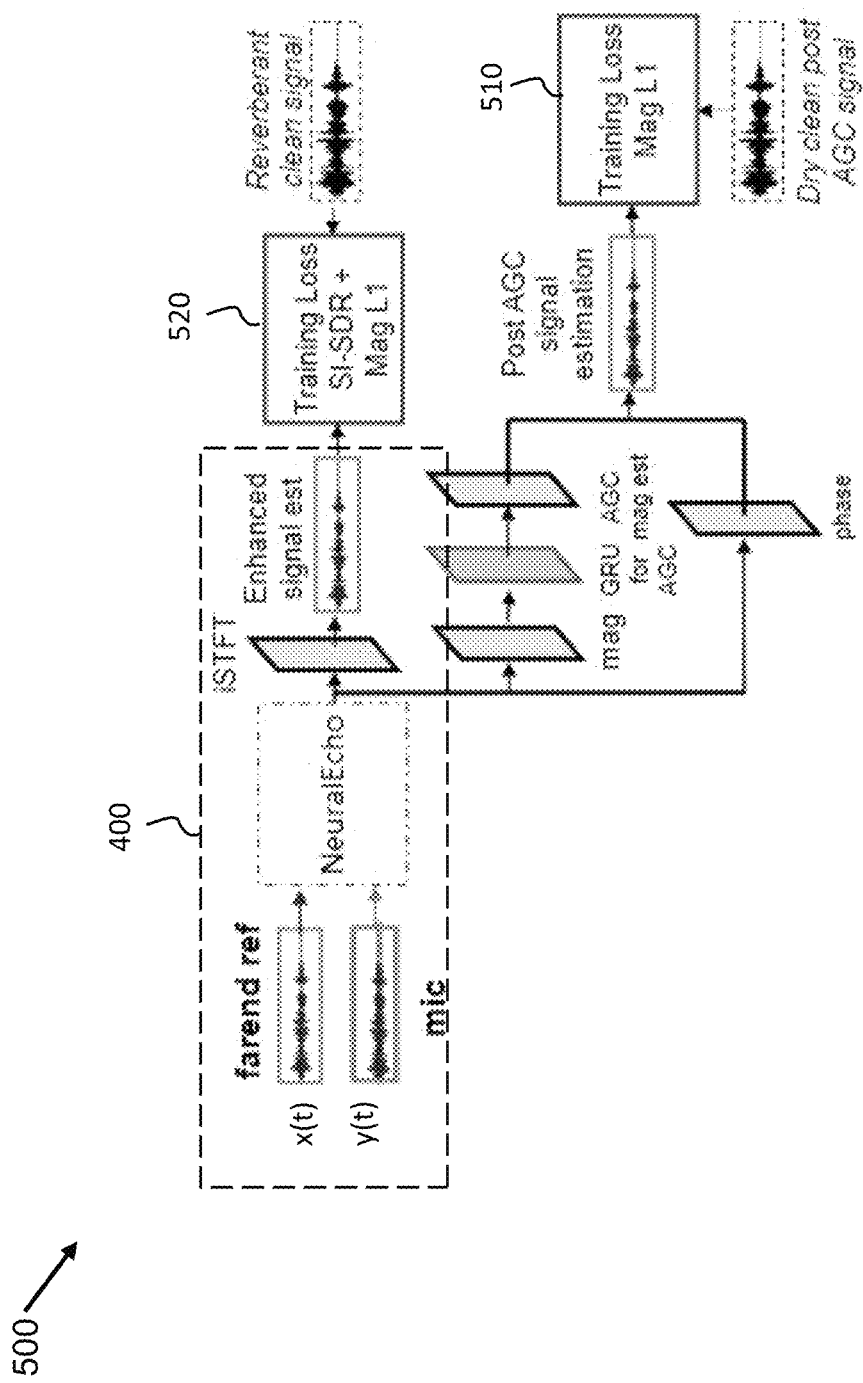
FIG. 5 illustrates an NeuralEcho model with automatic gain control (AGC), according to an embodiment.

FIG. 5 is an illustration of an AGC branch implemented with the NeuralEcho model 400, according to an embodiment. The AGC branch includes As shown in FIG. 5, an AGC branch is added at the output stage of the NeuralEcho model 400 in order to adjust and amplify the enhanced signal ^Sr or (a speech segment of the enhanced signal) to an intelligible sound level. A magnitude of the enhanced signal goes through a GRU layer (257 hidden units) to predict the post AGC magnitude, which is then combined with a phase of the NeuralEcho model's output signal to synthesize the post AGC signal estimation in the time-domain. An AGC tool is used to process the original dry clean data and generate the post-AGC dry clean target signal for training purposes. Therefore, the output of the AGC branch is expected to adjust sound level as well as suppress reverberation. Training loss SI-SDR and MAG L1 520 computes the loss function defined in Equation 6 using the combination of SI-SDR in the time domain and L1-norm of the spectrum magnitude difference between the enhanced signal ^Sr and the target signal Sr. SI-SDR leads to much slower convergence and worse performance on the dereverberation task. Therefore, the training loss Mag L1 510 uses L1-loss on the spectrum magnitude error between the estimated signal and the post-AGC dry clean target signal to adjust and amplify the speech signal while improving speech recognition accuracy.

Figure 6:
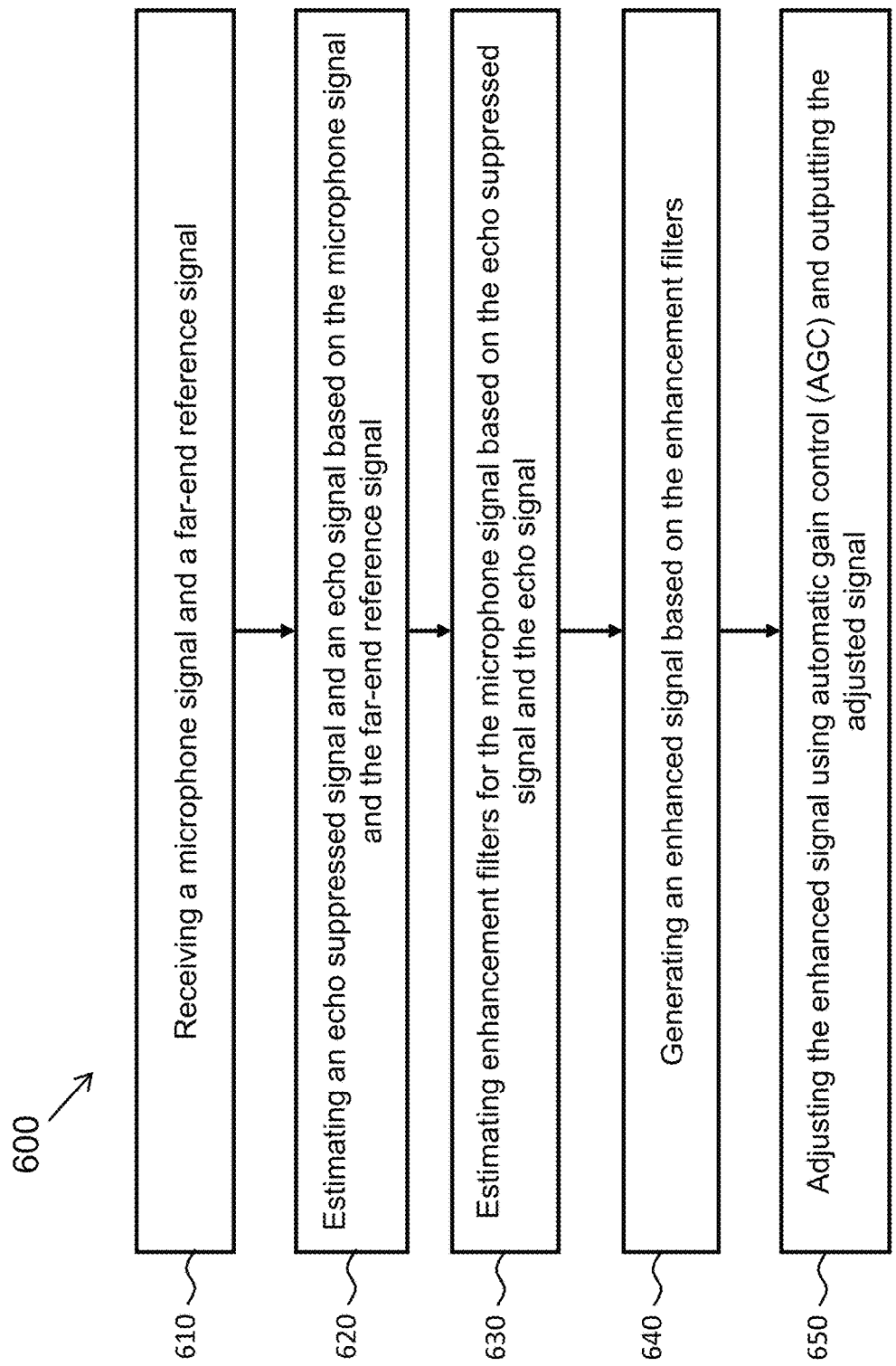
FIG. 6 is a flowchart of a method of end-to-end speaker diarization (EESD), according to an embodiment.

FIG. 6 is an exemplary flowchart illustrating a method 600, performed by at least one processor, for acoustic echo suppression using a recurrent neural network, according to an embodiment. In some implementations, one or more process blocks of FIG. 6 may be performed by the platform 120. In some implementations, one or more process blocks of FIG. 6 may be performed by another device or a group of devices separate from or including the platform 120, such as the user device 110.

In operation 610, the method 600 includes receiving a microphone signal and a far-end reference signal. The microphone signal may include a target speech, a distorted far-end reference signal, and microphone noise.

In operation 620, the method 600 includes estimating an echo suppressed signal and an echo signal based on the microphone signal and the far-end reference signal.

In operation 630, the method 600 includes estimating enhancement filters for the microphone signal based on the echo suppressed signal and the echo signal.

In operation 640, the method 600 includes generating an enhanced signal based on the enhancement filters.

The method 600 includes a first stage and a second stage, wherein operation 620 is performed by the first stage and operation 630 is performed the second stage. The first stage may include computing a first covariance matrix based on the microphone signal and the far-end reference signal, processing the first covariance matrix through a first linear projection filter and encoding a result of the first linear projection filter to estimate first stage filters, applying the first stage filters to a time-frequency shifted microphone signal and far-end reference signal, and outputting the echo suppressed signal and the echo signal. The second stage may include generating a second stage input feature based on the first linear projection filter and the normalized log-power spectra of the echo suppressed signal and the echo signal, processing the second stage input feature through a second linear projection filter, encoding a result of the second linear projection filter to estimate second stage filters, and applying the second stage filters to estimate channels of target speech and microphone noise, computing a second covariance matrix based on the estimated channels of target speech and microphone noise, and processing the second covariance matrix through the recurrent neural network and outputting the enhancement filters.

In operation 650, the method 600 includes adjusting the enhanced signal using automatic gain control (AGC) and outputting the adjusted signal. Operation 650 may further include encoding an enhanced signal magnitude to predict the AGC magnitude, generate an AGC signal in the time domain based on a phase of the enhanced signal, and adjusting the enhanced signal based on the AGC signal.

The function loss may be calculated based on a scale-invariant signal-to-distortion ratio in the time domain and the L1-norm of the spectrum magnitude difference between the enhanced signal and a target signal.

Although FIG. 6 shows example operations of the method, in some implementations, the method may include additional operations, fewer operations, different operations, or differently arranged operations than those depicted in FIG. 6. Additionally, or alternatively, two or more of the operations of the method may be performed in parallel or combined.

Figure 7:
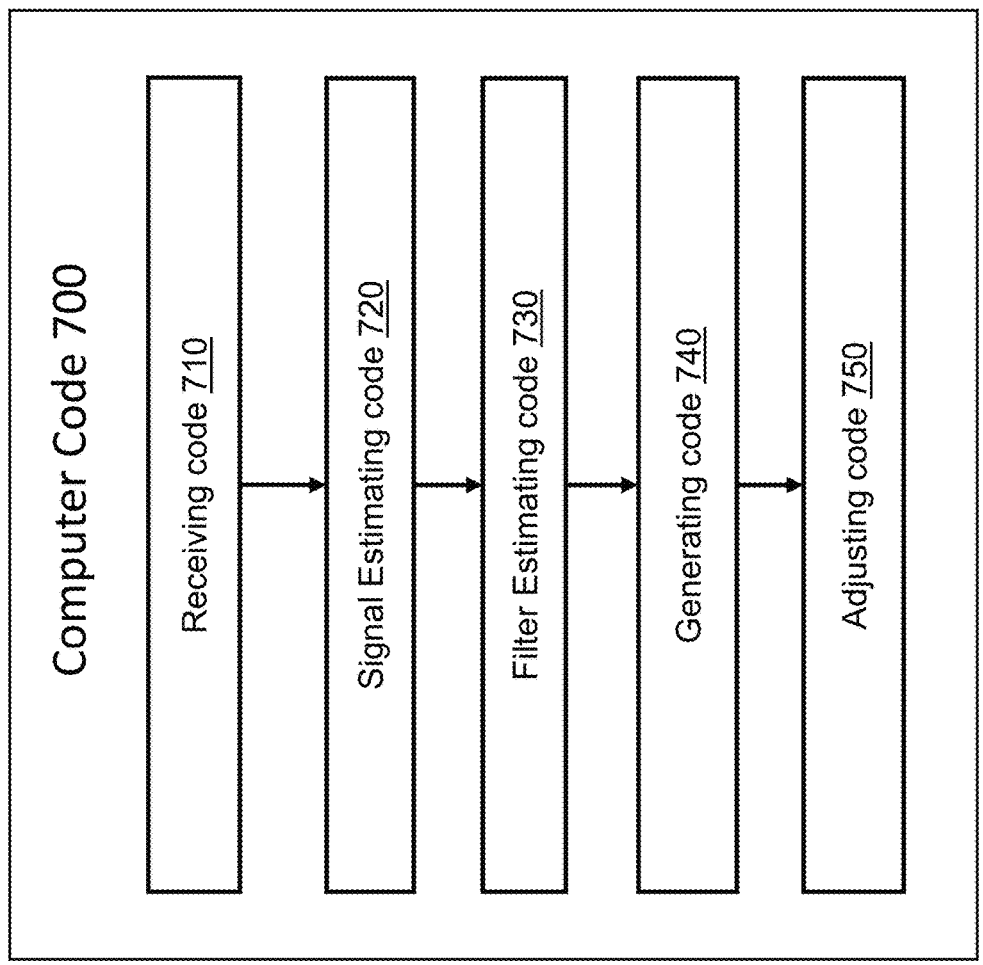
FIG. 7 is a block diagram of end-to-end speaker diarization (EESD), according to an embodiment.

FIG. 7 is a block diagram of an example of computer code for acoustic echo suppression using a recurrent neural network, according to one or more embodiments. According to embodiments of the present disclosure, an apparatus/device including at least one processor with memory storing computer code may be provided. The computer code may be configured to, when executed by the at least one processor, perform any number of aspects of the present disclosure.

As shown in FIG. 7, the computer code 700 includes receiving code 710, signal estimating code 720, filter estimating code 730, generating code 740, and adjusting code 750.

The receiving code 710 is configured to cause the at least one processor to receive a microphone signal and a far-end reference signal.

The signal estimating code 720 is configured to cause the at least one processor to estimate an echo suppressed signal and an echo signal based on the microphone signal and the far-end reference signal.

The filter estimating code 730 is configured to cause the at least one processor to estimate enhancement filters for the microphone signal based on the echo suppressed signal and the echo signal.

The generating code 740 is configured to cause the at least one processor to generate an enhanced signal based on the enhancement filters.

The adjusting code 750 is configured to cause the at least one processor to adjust the enhanced signal using automatic gain control (AGC) and outputting the adjusted signal. The adjusting code may further include encoding code configured to cause the at least one processor to encode an enhanced signal magnitude to predict the AGC magnitude, AGC generating code configured to cause the at least one processor to generate an AGC signal in the time domain based on a phase of the enhanced signal, and second adjusting code configured to cause the at least one processor to adjust the enhanced signal based on the AGC signal.

The computer code 700 may further include, in a first stage of the computer processing, computing code configured to cause the at least one processor to compute a first covariance matrix based on the microphone signal and the far-end reference signal, processing code configured to cause the at least one processor to process the first covariance matrix through a first linear projection filter and encoding a result of the first linear projection filter to estimate first stage filters, applying code configured to cause the at least one processor to apply the first stage filters to a time-frequency shifted microphone signal and far-end reference signal, and outputting code configured to cause the at least one processor to output the echo suppressed signal and the echo signal.

The computer code 700 may even further include, in a second stage of the computer processing, second generating code configured to cause the at least one processor to generate a second stage input feature based on the first linear projection filter and the normalized log-power spectra of the echo suppressed signal and the echo signal, second processing code configured to cause the at least one processor to process the second stage input feature through a second linear projection filter, encoding a result of the second linear projection filter to estimate second stage filters, and applying the second stage filters to estimate channels of target speech and microphone noise, second computing code configured to cause the at least one processor to compute a second covariance matrix based on the estimated channels of target speech and microphone noise, and third processing code configured to cause the at least one processor to process the second covariance matrix through the recurrent neural network and outputting the enhancement filters.

The computer code 700 may even further include calculating code configured to cause the at least one processor to calculate a loss functions based on a scale-invariant signal-to-distortion ratio in the time domain and the L1-norm of the spectrum magnitude difference between the enhanced signal and a target signal.

Although FIG. 7 shows example blocks of the computer code 700 of a system or apparatus according to embodiments, in some implementations, the system may include additional blocks, fewer blocks, different blocks, or differently arranged blocks than those depicted in FIG. 7. Additionally, or alternatively, two or more of the blocks of the system may be combined. In other words, while FIG. 7 shows distinct blocks of code, the various code instructions need not be distinct and could be intermingled.

Methods and systems described according to embodiments of this disclosure, compared to existing deep learning based approaches provide significant AEC feature learning by leveraging second order statistics across signal channels, and time and frequency axes. A self-attentive RNN neural network is also implemented to perform AEC on the microphone channel, intermediate AEC processed channel, and echo estimation channel to dynamically emphasize relevant features. The proposed model is further developed to work with speaker information and perform AGC for better target speaker enhancement. Experimental results showed that the NeuralEcho model, according to embodiments, and its derivatives yield a significant improvement to the conventional signal processing based method and the state-of-the-art neural network method in terms of both audio quality and speech recognition accuracy.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of acoustic echo suppression using a recurrent neural network, performed by at least one processor and comprising:
    receiving an audio signal and a far-end reference signal;
    estimating an echo suppressed signal and an echo signal based on the audio signal and the far-end reference signal;
    estimating enhancement filters for the audio signal based on the echo suppressed signal and the echo signal;
    generating an enhanced post AGC signal based on the enhancement filters;
    adjusting the enhanced post AGC signal using automatic gain control (AGC) to generate a clean post AGC signal and outputting the clean post AGC signal;
    calculating a first loss function based on a scale-invariant signal-to-distortion ratio in a time domain and an L1-norm of a spectrum magnitude difference between an enhanced signal estimation and a target signal; and
    calculating a second loss function based on a spectrum magnitude error between the enhanced post AGC signal and the clean post AGC signal.

2. The method of claim 1, further comprising a first stage and a second stage, wherein the echo suppressed signal and the echo signal are estimated by the first stage and the enhancement filters are estimated by the second stage.

3. The method of claim 2, wherein the first stage comprises:
    computing a first covariance matrix based on the audio signal and the far-end reference signal;
    processing the first covariance matrix through a first linear projection filter and encoding a result of the first linear projection filter to estimate first stage filters;
    applying the first stage filters to a time-frequency shifted audio signal and the far-end reference signal; and
    outputting the echo suppressed signal and the echo signal.

4. The method of claim 3, wherein the second stage comprises:
- generating a second stage input feature based on the first linear projection filter and a normalized log-power spectra of the echo suppressed signal and the echo signal;
- processing the second stage input feature through a second linear projection filter, encoding a result of the second linear projection filter to estimate second stage filters, and applying the second stage filters to estimate channels of target speech and microphone noise;
- computing a second covariance matrix based on the estimated channels of target speech and the microphone noise; and
- processing the second covariance matrix through the recurrent neural network and outputting the enhancement filters.

5. The method of claim 1, wherein the audio signal includes a target speech, a distorted far-end reference signal, and microphone noise.

6. The method of claim 1, wherein the audio signal is a microphone signal.

7. The method of claim 1, wherein the adjusting the enhanced post AGC signal comprises:
- encoding an enhanced signal magnitude to predict an AGC magnitude;
- generating an AGC signal in the time domain based on a phase of the enhanced post AGC signal; and
- adjusting the enhanced post AGC signal based on the AGC signal.

8. An apparatus for acoustic echo suppression using a recurrent neural network, the apparatus comprising:
- at least one memory that stores program code; and
- at least one processor configured to read the program code and operate as instructed by the program code, the program code including:
  - receiving code configured to cause the at least one processor to receive an audio signal and a far-end reference signal;
  - signal estimating code configured to cause the at least one processor to estimate an echo suppressed signal and an echo signal based on the audio signal and the far-end reference signal;
  - filter estimating code configured to cause the at least one processor to estimate enhancement filters for the audio signal based on the echo suppressed signal and the echo signal;
  - generating code configured to cause the at least one processor to generate an enhanced post AGC signal based on the enhancement filters;
  - adjusting code configured to cause the at least one processor to adjust the enhanced post AGC signal using automatic gain control (AGC) to generate a clean post AGC signal and outputting the clean post AGC signal; and
  - first calculating code configured to cause the at least one processor to calculate a first loss function based on a scale-invariant signal-to-distortion ratio in a time domain and an L1-norm of a spectrum magnitude difference between an enhanced signal estimation and a target signal; and
  - second calculating code configured to cause the at least one processor to calculate a second loss function based on a spectrum magnitude error between the enhanced post AGC signal and the clean post AGC signal.

9. The apparatus of claim 8, further comprising a first stage and a second stage, wherein the echo suppressed signal and the echo signal are estimated by the first stage and the enhancement filters are estimated by the second stage.

10. The apparatus of claim 9, the program code further including, in the first stage:
- computing code configured to cause the at least one processor to compute a first covariance matrix based on the audio signal and the far-end reference signal;
- processing code configured to cause the at least one processor to process the first covariance matrix through a first linear projection filter and encoding a result of the first linear projection filter to estimate first stage filters;
- applying code configured to cause the at least one processor to apply the first stage filters to a time-frequency shifted audio signal and the far-end reference signal; and
- outputting code configured to cause the at least one processor to output the echo suppressed signal and the echo signal.

11. The apparatus of claim 10, the program code further including, in the second stage:
- second generating code configured to cause the at least one processor to generate a second stage input feature based on the first linear projection filter and a normalized log-power spectra of the echo suppressed signal and the echo signal;
- second processing code configured to cause the at least one processor to process the second stage input feature through a second linear projection filter, encoding a result of the second linear projection filter to estimate second stage filters, and applying the second stage filters to estimate channels of target speech and microphone noise;
- second computing code configured to cause the at least one processor to compute a second covariance matrix based on the estimated channels of target speech and the microphone noise; and
- third processing code configured to cause the at least one processor to process the second covariance matrix through the recurrent neural network and outputting the enhancement filters.

12. The apparatus of claim 8, wherein the audio signal includes a target speech, a distorted far-end reference signal, and microphone noise.

13. The apparatus of claim 8, wherein the audio signal is a microphone signal.

14. The apparatus of claim 8, wherein the adjusting code further includes:
- encoding code configured to cause the at least one processor to encode an enhanced signal magnitude to predict an AGC magnitude;
- AGC generating code configured to cause the at least one processor to generate an AGC signal in the time domain based on a phase of the enhanced post AGC signal; and
- second adjusting code configured to cause the at least one processor to adjust the enhanced post AGC signal based on the AGC signal.

15. A non-transitory computer-readable medium storing instructions that, when executed by at least one processor of an apparatus for acoustic echo suppression using a recurrent neural network, cause the at least one processor to:
- generate an audio signal and a far-end reference signal;
- estimate an echo suppressed signal and an echo signal based on the audio signal and the far-end reference signal;

estimate enhancement filters for the audio signal based on the echo suppressed signal and the echo signal;

generate an enhanced post AGC signal based on the enhancement filters;

adjust the enhanced post AGC signal using automatic gain control (AGC) to generate a clean post AGC signal and outputting the clean post AGC signal;

calculating a first loss function based on a scale-invariant signal-to-distortion ratio in a time domain and an L1-norm of a spectrum magnitude difference between an enhanced signal estimation and a target signal; and calculating a second loss function based on a spectrum magnitude error between the enhanced post AGC signal and the clean post AGC signal.

16. The non-transitory computer-readable medium of claim 15, further comprising a first stage and a second stage, wherein the echo suppressed signal and the echo signal are estimated by the first stage and the enhancement filters are estimated by the second stage.

17. The non-transitory computer-readable medium of claim 16, wherein the instructions further cause the at least one processor to, in the first stage:

compute a first covariance matrix based on the audio signal and the far-end reference signal;

process the first covariance matrix through a first linear projection filter and encoding a result of the first linear projection filter to estimate first stage filters;

apply the first stage filters to a time-frequency shifted audio signal and the far-end reference signal; and output the echo suppressed signal and the echo signal.

18. The non-transitory computer-readable medium of claim 17, wherein the instructions further cause the at least one processor to, in the second stage:

generate a second stage input feature based on the first linear projection filter and a normalized log-power spectra of the echo suppressed signal and the echo signal;

process the second stage input feature through a second linear projection filter, encoding a result of the second linear projection filter to estimate second stage filters, and applying the second stage filters to estimate channels of target speech and microphone noise;

compute a second covariance matrix based on the estimated channels of target speech and the microphone noise; and process the second covariance matrix through the recurrent neural network and outputting the enhancement filters.

19. The non-transitory computer-readable medium of claim 15, wherein the audio signal includes a target speech, a distorted far-end reference signal, and microphone noise.

20. The non-transitory computer-readable medium of claim 15, wherein the audio signal is a microphone signal.

* * * * *